(12) United States Patent
Dai

(10) Patent No.: US 10,968,640 B2
(45) Date of Patent: Apr. 6, 2021

(54) STONE-PLASTIC HOT PRESSING FLOORING AND MANUFACTURING METHOD THEREOF

(71) Applicant: ZHEJIANG KINGDOM PLASTICS INDUSTRY CO., LTD., Jiaxing (CN)

(72) Inventor: Huibin Dai, Jiaxing (CN)

(73) Assignee: ZHEJIANG KINGDOM PLASTICS INDUSTRY CO., LTD., Jiaxing (CN)

(*) Notice: Subject to any disclaimer, the term of this patent is extended or adjusted under 35 U.S.C. 154(b) by 72 days.

(21) Appl. No.: 16/314,372

(22) PCT Filed: Sep. 30, 2017

(86) PCT No.: PCT/CN2017/105072
§ 371 (c)(1),
(2) Date: Dec. 28, 2018

(87) PCT Pub. No.: WO2019/061518
PCT Pub. Date: Apr. 4, 2019

(65) Prior Publication Data
US 2019/0352915 A1    Nov. 21, 2019

(51) Int. Cl.
| | |
|---|---|
| *B32B 38/00* | (2006.01) |
| *E04F 15/10* | (2006.01) |
| *C08K 3/013* | (2018.01) |
| *B32B 27/20* | (2006.01) |
| *B32B 27/22* | (2006.01) |
| *B32B 27/30* | (2006.01) |
| *B32B 37/06* | (2006.01) |
| *B32B 37/10* | (2006.01) |
| *C08J 5/12* | (2006.01) |
| *C08K 3/04* | (2006.01) |

(52) U.S. Cl.
CPC ............ *E04F 15/105* (2013.01); *B32B 27/20* (2013.01); *B32B 27/22* (2013.01); *B32B 27/304* (2013.01); *B32B 37/06* (2013.01); *B32B 37/10* (2013.01); *C08J 5/121* (2013.01); *C08K 3/013* (2018.01); *C08K 3/04* (2013.01); *E04F 15/107* (2013.01); *B32B 2264/108* (2013.01); *B32B 2264/12* (2013.01); *B32B 2307/402* (2013.01); *B32B 2307/554* (2013.01); *B32B 2307/72* (2013.01); *B32B 2419/04* (2013.01)

(58) Field of Classification Search
CPC ...... E04F 15/105; E04F 15/107; C08K 3/013; C08K 3/04; B32B 27/20; B32B 27/22; B32B 27/304; B32B 37/06; B32B 37/10; B32B 2264/108; B32B 2264/12; B32B 2307/402; B32B 2307/554; B32B 2307/72; B32B 2419/04; B32B 38/004; B32B 37/144; C08J 5/121
See application file for complete search history.

(56) References Cited

U.S. PATENT DOCUMENTS

2013/0266759 A1* 10/2013 Kim ...................... B32B 21/08
428/106

FOREIGN PATENT DOCUMENTS

| CN | 202318503 U | * | 7/2012 |
|---|---|---|---|
| CN | 202318503 U | | 7/2012 |
| CN | 104626704 A | | 5/2015 |
| CN | 106381979 A | * | 2/2017 |
| CN | 106381979 A | | 2/2017 |
| CN | 107118472 A | | 9/2017 |
| CN | 107163442 A | * | 9/2017 |
| EP | 0263964 A2 | | 4/1988 |

* cited by examiner

*Primary Examiner* — Matthew J Daniels
*Assistant Examiner* — Andrew L Swanson
(74) *Attorney, Agent, or Firm* — Schwegman Lundberg & Woessner, P.A.

(57) ABSTRACT

The present invention provides stone-plastic hot pressing flooring including a stone-plastic base material part which includes a middle material layer, a stone-plastic substrate layer, and a bottom material layer sequentially arranged side by side; —a color film layer, located at one side of an upper surface of the stone-plastic base material part; —a first wear-resistant layer, located at one side of an upper surface of the color film layer; and —a second wear-resistant layer, located at one side of a lower surface of the stone-plastic base material part; and wherein the middle material layer and the bottom material layer are mainly composed of polyvinyl chloride, plasticizer, stabilizer, carbon black, and stone powder.

5 Claims, No Drawings

STONE-PLASTIC HOT PRESSING FLOORING AND MANUFACTURING METHOD THEREOF

CROSS REFERENCE TO RELATED APPLICATIONS

This application is a national phase entry of PCT/CN2017/105072 filed Sep. 30, 2017 and is hereby incorporated herein by reference.

BACKGROUND OF THE INVENTION

Field of the Invention

This invention relates to stone-plastic hot pressing flooring and a manufacturing method thereof and, more particularly, to a field of a building material.

Description of the Related Art

Stone-plastic flooring, which is also called a stone-plastic floor tile, is a high-quality and new ground decorative material researched and developed by high technology. Natural marble powder is used to form a solid base layer with a high-density and high-fiber mesh structure, and a surface is covered with a super-wear-resistant polymer PVC wear-resistant layer, which is processed by hundreds of processes.

Compared with other ground decorative materials, the stone-plastic flooring has the following advantages. 1) Green and environmentally friendly: the main raw material in the production of the stone-plastic flooring is natural stone powder, which is a new green and environmentally friendly ground decoration material. 2) The stability of the stone-plastic is good, which will not arch or warp. 3) Super-wear-resistant: there is a special transparent wear-resistant layer processed by high-tech and the wear-resistant revolution can reach up to 300000 rpm. In traditional ground materials, the wear-resistant revolution of laminated flooring which is relatively wear-resistant is only 13000 rpm and the good laminated flooring is only 20000 rpm. The super wear-resistant layer with a special treated surface fully guarantees the excellent wear-resistant property of ground materials. Under normal circumstances, the wear-resistant layer of the Stone-plastic flooring surface can be used 5 to 10 years according to the different thickness. The thickness and quality of the wear-resistant layer directly determine the service life of the Stone-plastic flooring. The standard test result shows that the wear-resistant layer flooring of 0.55 mm thick can be used for more than 5 years under normal circumstances, the wear-resistant layer ground of 0.7 mm thick can be used for more than 10 years and so it is even super wear-resistant. Because of the super wear-resistant property, in hospitals, schools, office buildings, shopping malls, supermarkets and other places with relatively large flow of people, the stone-plastic flooring is more and more popular. 4) High elasticity and super impact resistance: the elasticity of the stone-plastic flooring is very good as the texture is relatively soft and the stone-plastic flooring has a fine elastic recovery under the impact of heavy objects. Its foot feeling is comfortable and is called the "flooring material soft gold". At the same time, the stone-plastic flooring has a strong impact resistance, which has a strong elastic recovery under impact and damage of heavy objects and will not cause damage. Excellent stone-plastic flooring can minimize the damage of ground to the human body and can spread the impact to the foot. The latest research data shows that in the space of relatively large flow of people, after the excellent stone-plastic flooring is paved, the rate of falls and injuries of staffs is nearly 70% lower than that of other flooring. 5) Super anti-skid: the wear-resistant layer of the stone-plastic flooring surface has a special skid resistant property, and compared with ordinary ground materials, in the case of sticky water, the foot feeling is more hard-going and it is not easy to skid, that is, the more water encounters, the more hard-going it is. 6) Fire retardant: the fireproof index of the quality qualified stone-plastic flooring can reach up to B1 level. B1 level is that the fireproof performance is very good and is next only to the stone material.

The existing stone-plastic hot pressing flooring has defects of high mute value, relatively high density, and bad foot feeling.

BRIEF SUMMARY OF THE INVENTION

1) Technical Problems of Stone-Plastic Hot Pressing Flooring to be Solved

The objective of the present invention is to provide stone-plastic hot pressing flooring which can overcome defects of relatively high density, bad foot feeling, and high mute value in the existing stone-plastic hot pressing flooring.

2) Technical Solution

To solve the above-mentioned technical problem, the present invention provides stone-plastic hot pressing flooring including a stone-plastic base material part including a middle material layer, a stone-plastic substrate layer, and a bottom material layer sequentially arranged side by side; a color film layer, located at one side of an upper surface of the stone-plastic base material part; a first wear-resistant layer, located at one side of an upper surface of the color film layer; and a second wear-resistant layer, located at one side of a lower surface of the stone-plastic base material part; wherein both the middle material layer and the bottom material layer are mainly composed of polyvinyl chloride, plasticizer, stabilizer, carbon black, and stone powder.

In this invention, tension balance of the stone-plastic substrate layer is achieved by symmetrically arranging the middle material layer and the bottom material layer relative to the stone-plastic substrate layer, making the middle material layer and the bottom material layer mainly by the polyvinyl chloride, plasticizer, stabilizer, carbon black, and stone powder, and symmetrically arranging the first wear-resistant layer and the second wear-resistant layer. Under the condition that the stability of the product is ensured, the density of the product is reduced, the foot feeling is improved, and the mute value is reduced.

Optionally, both thicknesses of the first wear-resistant layer and the second wear-resistant layer are in a range of 0.07-0.7 mm, and a thickness of the color film layer is a range of 0.07-0.7 mm; and a thickness of the stone-plastic substrate layer is in a range of 1.5-4.0 mm, a thickness of the middle material layer is in a range of 1.8-2.0 mm, and a thickness of the bottom material layer is in a range of 1.6-1.8 mm.

Optionally, both densities of the first wear-resistant layer and the second wear-resistant layer are in a range of 1.10-1.40 $g/cm^3$.

Optionally, a density of the stone-plastic substrate layer is in a range of 1.8-2.1 $g/cm^3$, a density of the middle material layer is in a range of 1.6-2.0 g/cm³, and a density of the bottom material layer is in a range of 1.6-2.0 g/cm³.

Optionally, parts by weight of the polyvinyl chloride, plasticizer, stabilizer, carbon black, and stone powder in the middle material layer are 100: (35-40): (2-5): (0.5-2): (400-500).

Optionally, parts by weight of polyvinyl chloride, plasticizer, stabilizer, carbon black, and stone powder in the bottom material layer are 100:(25-35):(2-5):(0.5-2):(100-200).

Optionally, the plasticizer is made from dioctyl terephthalate.

Optionally, a contraction rate of the stone-plastic hot pressing flooring is in a range of 0.60%-0.90%.

Optionally, an expansion rate of the stone-plastic hot pressing flooring is in a range of 0.10%-0.15%.

Optionally, a mute value of the stone-plastic hot pressing flooring is in a range of 65-75 decibels.

The present invention further provides a manufacturing method of the above-mentioned stone-plastic hot pressing flooring including the following steps:

adding and mixing raw materials of the bottom material layer according to the above mentioned constituent to obtain a bottom material layer intermediate, and then internal-mixing and calendering the bottom material layer intermediate to obtain a bottom material layer sheet;

adding and mixing raw materials of a middle material layer according to the above mentioned constituent to obtain a middle material layer intermediate, and then internal-mixing and calendering the middle material layer intermediate to obtain a middle material layer sheet;

mixing, internal-mixing, and calendering raw materials of the stone-plastic substrate layer to obtain a stone-plastic substrate layer sheet; and sequentially arranging a first wear-resistant layer film, a color film, the middle material layer sheet, the stone-plastic substrate layer sheet, the bottom material layer sheet, and a second wear-resistant layer film, and then carrying out a hot pressing process to obtain a finished product.

Optionally, in the hot pressing process, a pressure is controlled in a range of 3-6 MPa, a temperature is controlled in a range of 125-145° C., and hot pressing time is controlled in a range of 1500-2100 s.

Optionally, the manufacturing method of the stone-plastic hot pressing flooring further includes a cold pressing process. The cold pressing process is carried out after the hot pressing process and includes a first cold pressing process and a second cold pressing process.

In the first cold pressing process, a pressure is controlled in a range of 5-8 MPa, a temperature is controlled in a range of 80-145° C., and cold pressing time is controlled in a range of 600-800 s.

Optionally, in the second cold pressing process, a pressure is controlled in a range of 8-15 MPa, a temperature is controlled in a range of 23-80° C., and cold pressing time is controlled in a range of 800-1000 s.

Optionally, after calendering the bottom material layer intermediate or the middle material layer intermediate or the stone-plastic substrate layer, a slicing operation is further included.

3) Beneficial Effects

The present invention provides stone-plastic hot pressing flooring having the following advantages.

In this invention, by increasing the middle material layer and the bottom material layer and controlling the weight ratio of the middle material layer and the bottom material layer, a locking pulling force of the stone-plastic hot pressing flooring is increased, at the same time, the density and hardness of the product are decreased, and the decrease of the hardness of the product improves the foot feeling of the product.

DETAILED DESCRIPTION OF THE INVENTION

A specific implementation of the present invention is further described in detail below in combination with embodiments. The following embodiments are used to illustrate the present invention, but are not intended to limit the scope of the present invention.

All the "a" in the present invention should be interpreted as "at least one" or "one or two or more".

The present invention provides stone-plastic hot pressing flooring including a stone-plastic base material part which includes a middle material layer, a stone-plastic substrate layer, and a bottom material layer sequentially arranged side by side; a color film layer, located at one side of an upper surface of the stone-plastic base material part; a first wear-resistant layer, located at one side of an upper surface of the color film layer; and a second wear-resistant layer, located at one side of a lower surface of the stone-plastic base material part; and wherein the middle material layer and the bottom material layer are mainly composed of polyvinyl chloride, plasticizer, stabilizer, carbon black, and stone powder.

Both thicknesses of the first wear-resistant layer and the second wear-resistant layer are in a range of 0.07-0.7 mm, and a thickness of the color film layer is in a range of 0.07-0.7 mm; and a thickness of the stone-plastic substrate layer is in a range of 1.5-4.0 mm, a thickness of the middle material layer is in a range of 1.8-2.0 mm, and a thickness of the bottom material layer is in a range of 1.6-1.8 mm.

Densities of the first wear-resistant layer and the second wear-resistant layer are in a range of 1.10-1.40 g/cm³.

A density of the stone-plastic substrate layer is in a range of 1.8-2.1 g/cm³, a density of the middle material layer is in a range of 1.6-2.0 g/cm³, and a density of the bottom material layer is in a range of 1.6-2.0 g/cm³.

Parts by weight of polyvinyl chloride, plasticizer, stabilizer, carbon black, and stone powder in the middle material layer are 100:(35-40):(2-5):(0.5-2):(400-500).

Parts by weight of polyvinyl chloride, plasticizer, stabilizer, carbon black, and stone powder in the bottom material layer are 100:(25-35):(2-5):(0.5-2):(100-200).

The plasticizer is made from dioctyl terephthalate.

A contraction rate of the stone-plastic hot pressing flooring is in a range of 0.60%-0.90%.

An expansion rate of the stone-plastic hot pressing flooring is in a range of 0.10%-0.15%.

A mute value of the stone-plastic hot pressing flooring is in a range of 65-75 decibels.

The present invention further provides a manufacturing method of the above-mentioned stone-plastic hot pressing flooring including the following steps:

adding and mixing raw materials of the bottom material layer according to the above mentioned formula ratio to obtain a bottom material layer intermediate, and then internal-mixing and calendering the bottom material layer intermediate to obtain a bottom material layer sheet;

adding and mixing raw materials of a middle material layer according to the above mentioned formula ratio to obtain a middle material layer intermediate, and then internal-mixing and calendering the middle material layer intermediate to obtain a middle material layer sheet;

mixing, internal-mixing, and calendering raw materials of the stone-plastic substrate layer to obtain a stone-plastic base matter sheet; and sequentially arranging a first wear-resistant layer film, a color film, the middle material layer sheet, the stone-plastic base matter sheet, the bottom material layer sheet, and a second wear-resistant layer film, and then carrying out a hot pressing process to obtain a finished product.

In the hot pressing process, a pressure is controlled in a range of 3-6 MPa, a temperature is controlled in a range of 125-145° C., and hot pressing time is controlled in a range of 1500-2100 s.

The manufacturing method of the stone-plastic hot pressing flooring further includes a cold pressing process. The cold pressing process is carried out after the hot pressing process and includes a first cold pressing process and a second cold pressing process.

In the first cold pressing process, a pressure is controlled in a range of 5-8 MPa, a temperature is controlled in a range of 80-145° C., and cold pressing time is controlled in a range of 600-800 s.

In the second cold pressing process, a pressure is controlled in a range of 8-15 MPa, a temperature is controlled in a range of 23-80° C., and cold pressing time is controlled in a range of 800-1000 s.

After calendering the bottom material layer intermediate or the middle material layer intermediate or the stone-plastic substrate layer, a slicing operation is further included.

The formula of the stone-plastic substrate layer of the present embodiment is:

| Name | Amount (kg) |
| --- | --- |
| PVC-SG5 | 50 |
| stone powder at 400 mesh | 110 |
| stabilizer | 6 |
| stearic acid | 0.7 |
| PE wax | 0.6 |
| ACR | 4 |
| CPE (chlorinated polyethylene) | 4 |

ACR is a series of impact modifiers.

A specific description is carried out by embodiments below.

Embodiment One

A stone-plastic hot pressing flooring includes a stone-plastic base material part, and the stone-plastic base material part includes a middle material layer, a stone-plastic substrate layer, and a bottom material layer sequentially arranged side by side; a color film layer, located at one side of an upper surface of the stone-plastic base material part; a first wear-resistant layer, located at one side of an upper surface of the color film layer; and a second wear-resistant layer, located at one side of a lower surface of the stone-plastic base material part; and wherein the middle material layer and the bottom material layer are mainly composed of polyvinyl chloride, dioctyl terephthalate, plasticizer, stabilizer, carbon black, and stone powder.

Thicknesses of the first wear-resistant layer and the second wear-resistant layer are 0.07 mm, and a thickness of the color film layer is 0.07 mm; and a thickness of the stone-plastic substrate layer is 1.5 mm, a thickness of the middle material layer is 1.8 mm, and a thickness of the bottom material layer is 1.6 mm.

Densities of the first wear-resistant layer and the second wear-resistant layer are 1.10 g/cm³. A density of the stone-plastic substrate layer is 1.8 g/cm³, a density of the middle material layer is 1.6 g/cm³, and a density of the bottom material layer is 1.6 g/cm³.

Parts by weight of polyvinyl chloride, plasticizer, stabilizer, carbon black, and stone powder in the middle material layer are 100:35:2-5:0.5:400. Parts by weight of polyvinyl chloride, plasticizer, stabilizer, carbon black, and stone powder in the bottom material layer are 100:25:2:0.5:100.

The manufacturing process thereof includes the following steps:

1) adding raw materials of a bottom material layer according to the above-mentioned formula ratio and mixing the raw materials to obtain a bottom material layer intermediate, and then internal-mixing and calendering the bottom material layer intermediate to obtain a bottom material layer sheet;

2) adding raw materials of a middle material layer according to the above-mentioned formula ratio and mixing the raw materials to obtain a middle material layer intermediate, and then internal-mixing and calendering the middle material layer intermediate to obtain a middle material layer sheet;

3) mixing, internal-mixing, calendering, and slicing raw materials of the stone-plastic substrate layer to obtain a stone-plastic substrate layer sheet; and 4) sequentially arranging a first wear-resistant layer film, a color film, the middle material layer sheet, the stone-plastic substrate layer sheet, the bottom material layer sheet, and a second wear-resistant layer film, and then carrying out a hot pressing process to obtain a finished product.

In the hot pressing process, a pressure is controlled at 3 MPa, a temperature is controlled at 125° C., and hot pressing time is controlled at 1500 s.

The cold pressing process includes a first cold pressing process and a second cold pressing process. In the first cold pressing process, a pressure is controlled at 5 MPa, a temperature is controlled at 80° C., and cold pressing time is controlled at 600 s. In the second cold pressing process, a pressure is controlled at 8 MPa, a temperature is controlled at 23° C., and cold pressing time is controlled at 800 s.

The performance of the obtained product is as follows:

| Project name | Stone-plastic hot pressing |
| --- | --- |
| hardness | 65HD |
| expansion rate at 50° C. | 0.10% |
| contraction rate at 80° C. | 0.60% |
| warpage at 80° C. | 0.4 mm |
| mute value | 65 decibels |

Embodiment Two

A stone-plastic hot pressing floor includes a stone-plastic base material part, and the stone-plastic base material part includes a middle material layer, a stone-plastic substrate layer, and a bottom material layer sequentially arranged side by side; a color film layer, located at one side of an upper surface of the stone-plastic base material part; a first wear-resistant layer, located at one side of an upper surface of the color film layer; and a second wear-resistant layer, located at one side of a lower surface of the stone-plastic base material part; and wherein the middle material layer and the bottom material layer are mainly composed of polyvinyl chloride, dioctyl terephthalate, plasticizer, stabilizer, carbon black, and stone powder.

Thicknesses of the first wear-resistant layer and the second wear-resistant layer are 0.7 mm, and a thickness of the color film layer is 0.7 mm; and a thickness of the stone-plastic substrate layer is 4.0 mm, a thickness of the middle material layer is 2.0 mm, and a thickness of the bottom material layer is 1.8 mm.

Densities of the first wear-resistant layer and the second wear-resistant layer are 1.40 g/cm³. A density of the stone-plastic substrate layer is 2.1 g/cm³, a density of the middle material layer is 2.0 g/cm³, and a density of the bottom material layer is 2.0 g/cm³.

Parts by weight of polyvinyl chloride, plasticizer, stabilizer, carbon black, and stone powder in the middle material layer are 100:40:5:2:500.

Parts by weight of polyvinyl chloride, plasticizer, stabilizer, carbon black, and stone powder in the bottom material layer are 100:35:5:2:200.

The manufacturing process thereof includes the following steps:
1) adding raw materials of a bottom material layer according to the above-mentioned formula ratio and mixing the raw materials to obtain a bottom material layer intermediate, and then internal-mixing and calendering the bottom material layer intermediate to obtain a bottom material layer sheet;
2) adding raw materials of a middle material layer according to the above-mentioned formula ratio and mixing the raw materials to obtain a middle material layer intermediate, and then internal-mixing and calendering the middle material layer intermediate to obtain a middle material layer sheet;
3) mixing, internal-mixing, calendering, and slicing raw materials of the stone-plastic substrate layer to obtain a stone-plastic substrate layer sheet; and
4) sequentially arranging a first wear-resistant layer film, a color film, the middle material layer sheet, the stone-plastic substrate layer sheet, the bottom material layer sheet, and a second wear-resistant layer film, and then carrying out a hot pressing process to obtain a finished product.

In the hot pressing process, a pressure is controlled at 6 MPa, a temperature is controlled at 145° C., and hot pressing time is controlled at 2100 s.

The cold pressing process includes a first cold pressing process and a second cold pressing process. In the first cold pressing process, a pressure is controlled at 8 MPa, a temperature is controlled at 145° C., and cold pressing time is controlled at 800 s. In the second cold pressing process, a pressure is controlled at 15 MPa, a temperature is controlled at 80° C., and cold pressing time is controlled at 1000 s.

The performance of the obtained product is as follows:

| Project name | Stone-plastic hot pressing |
| --- | --- |
| hardness | 62 HD |
| expansion rate at 50° C. | 0.15% |
| contraction rate at 80° C. | 0.9% |
| warpage at 80° C. | 0.3 mm |
| mute value | 75 decibels |

Embodiment Three

A stone-plastic hot pressing floor includes a stone-plastic base material part, and the stone-plastic base material part includes a middle material layer, a stone-plastic substrate layer, and a bottom material layer sequentially arranged side by side; a color film layer, located at one side of an upper surface of the stone-plastic base material part; a first wear-resistant layer, located at one side of an upper surface of the color film layer; and a second wear-resistant layer, located at one side of a lower surface of the stone-plastic base material part; and wherein the middle material layer and the bottom material layer are mainly composed of polyvinyl chloride, dioctyl terephthalate, plasticizer, stabilizer, carbon black, and stone powder.

Thicknesses of the first wear-resistant layer and the second wear-resistant layer are 0.45 mm, and a thickness of the color film layer is 0.45 mm; and a thickness of the stone-plastic substrate layer is 2.75 mm, a thickness of the middle material layer is 1.5 mm, and a thickness of the bottom material layer is 0.05 mm.

Densities of the first wear-resistant layer and the second wear-resistant layer are 1.4 g/cm³. A density of the stone-plastic substrate layer is 1.95 g/cm³, a density of the middle material layer is 1.9 g/cm³, and a density of the bottom material layer is 1.9 g/cm³.

Parts by weight of polyvinyl chloride, plasticizer, stabilizer, carbon black, and stone powder in the middle material layer are 100:37.5:3.5:1.25:450.

Parts by weight of polyvinyl chloride, plasticizer, stabilizer, carbon black, and stone powder in the bottom material layer are 100:30:3.5:1.25:150.

The manufacturing process thereof includes the following steps:
1) adding raw materials of a bottom material layer according to the above-mentioned formula ratio and mixing the raw materials to obtain a bottom material layer intermediate, and then internal-mixing and calendering the bottom material layer intermediate to obtain a bottom material layer sheet;
2) adding raw materials of a middle material layer according to the above-mentioned formula ratio and mixing the raw materials to obtain a middle material layer intermediate, and then internal-mixing and calendering the middle material layer intermediate to obtain a middle material layer sheet;
3) mixing, internal-mixing, calendering, and slicing raw materials of the stone-plastic substrate layer to obtain a stone-plastic substrate layer sheet; and
4) sequentially arranging a first wear-resistant layer film, a color film, the middle material layer sheet, the stone-plastic substrate layer sheet, the bottom material layer sheet, and a second wear-resistant layer film, and then carrying out a hot pressing process to obtain a finished product.

In the hot pressing process, a pressure is controlled at 4.5 MPa, a temperature is controlled at 135° C., and hot pressing time is controlled at 1800 s.

The cold pressing process includes a first cold pressing process and a second cold pressing process. In the first cold pressing process, a pressure is controlled at 6.5 MPa, a temperature is controlled at 112.5° C., and cold pressing time is controlled at 700 s. In the second cold pressing process, a pressure is controlled at 11.5 MPa, a temperature is controlled at 51.5° C., and cold pressing time is controlled at 900 s.

| Project name | Stone-plastic hot pressing |
| --- | --- |
| hardness | 63 HD |
| expansion rate at 50° C. | 0.12% |
| contraction rate at 80° C. | 0.75% |
| warpage at 80° C. | 0.3 mm |
| mute value | 70 decibels |

Comparative Example One

A stone-plastic hot pressing floor includes a stone-plastic base material part, and the stone-plastic base material part includes a middle material layer, a stone-plastic substrate layer, and a bottom material layer sequentially arranged side by side; a color film layer, located at one side of an upper surface of the stone-plastic base material part; a first wear-resistant layer, located at one side of an upper surface of the color film layer; and a second wear-resistant layer, located at one side of a lower surface of the stone-plastic base material part; and wherein the middle material layer and the bottom material layer are mainly composed of polyvinyl chloride, dioctyl terephthalate, plasticizer, stabilizer, carbon black, and stone powder.

Thicknesses of the first wear-resistant layer and the second wear-resistant layer are 0.85 mm, and a thickness of the color film layer is 0.85 mm; and a thickness of the stone-plastic substrate layer is 4.1 mm, a thickness of the middle material layer is 1.9 mm, and a thickness of the bottom material layer is 1.7 mm.

Densities of the first wear-resistant layer and the second wear-resistant layer are 1.25 g/cm$^3$. A density of the stone-plastic substrate layer is 3.4 g/cm$^3$, a density of the middle material layer is 1.8 g/cm$^3$, and a density of the bottom material layer is 1.8 g/cm$^3$.

Parts by weight of polyvinyl chloride, plasticizer, stabilizer, carbon black and stone powder in the middle material layer are 100:42:7:3:600.

Parts by weight of polyvinyl chloride, plasticizer, stabilizer, carbon black and stone powder in the bottom material layer are 100:37:7:3:300.

The manufacturing process thereof includes the following steps:
1) adding raw materials of a bottom material layer according to the above-mentioned formula ratio and mixing the raw materials to obtain a bottom material layer intermediate, and then internal-mixing and calendering the bottom material layer intermediate to obtain a bottom material layer sheet;
2) adding raw materials of a middle material layer according to the above-mentioned formula ratio and mixing the raw materials to obtain a middle material layer intermediate, and then internal-mixing and calendering the middle material layer intermediate to obtain a middle material layer sheet;
3) mixing, internal-mixing, calendering, and slicing raw materials of the stone-plastic substrate layer to obtain a stone-plastic substrate layer sheet; and
4) sequentially arranging a first wear-resistant layer film, a color film, the middle material layer sheet, the stone-plastic substrate layer sheet, the bottom material layer sheet, and a second wear-resistant layer film, and then carrying out a hot pressing process to obtain a finished product.

In the hot pressing process, a pressure is controlled at 6.0 MPa, a temperature is controlled at 160° C., and hot pressing time is controlled at 2300 s.

The cold pressing process includes a first cold pressing process and a second cold pressing process. In the first cold pressing process, a pressure is controlled at 9 MPa, a temperature is controlled at 155° C., and cold pressing time is controlled at 900 s. In the second cold pressing process, a pressure is controlled at 17 MPa, a temperature is controlled at 90° C., and cold pressing time is controlled at 1200 s.

The product performance of the common stone-plastic flooring in the existing market:

| Project name | Stone-plastic hot pressing |
| --- | --- |
| hardness | 63 HD |
| expansion rate at 50° C. | 0.20% |
| contraction rate at 80° C. | 1.21% |
| warpage at 80° C. | 0.5 mm |
| mute value | 90 decibels |

The product performance of the existing stone-plastic flooring on the market is:

| Project name | Stone-plastic hot pressing |
| --- | --- |
| hardness | 75 HD |
| expansion rate at 50° C. | 0.32% |
| contraction rate at 80° C. | 1.75% |
| warpage at 80° C. | 0.7 mm |
| mute value | 105 decibels |

To sum up, it can be seen from Embodiment One and Embodiment Two that, by using the technology within the process scope, the density of the obtained hot pressing stone-plastic flooring is lower than that of the existing product, and the hardness is lower than that of the existing product; while the expansion rate at 50, the contraction rate at 80° C. and the mute value are much lower than those of the existing products, making the product yield greatly improved.

From comparative Example One, it can be seen that, when exceeding the process scope in Embodiment One and Two, the hardness, the expansion rate at 50° C., the contraction rate at 80° C. and the warpage at 80° C. are more closer to those of the existing products, which is far more behind the product performance in Embodiment One, Embodiment Two, and Embodiment Three.

The above description are only preferred embodiments of the present invention, and thus does not limit the scope of patent protection of the present invention. Any equivalent structural transformation made by using the contents of the specification of the present invention or directly or indirectly applying the present invention to other related technical fields is included in the scope of protection of the present invention.

What is claimed is:

1. A manufacturing method of stone-plastic hot pressing flooring, wherein the stone-plastic hot pressing flooring comprises
a stone-plastic base material part, comprising a middle material layer, a stone-plastic substrate layer, and a bottom material layer sequentially arranged side by side;
a color film layer, located at one side of an upper surface of the stone-plastic base material part;
a first wear-resistant layer, located at one side of an upper surface of the color film layer; and a second wear-resistant layer, located at one side of a lower surface of the stone-plastic base material part;

wherein both the middle material layer and the bottom material layer are mainly composed of polyvinyl chloride, plasticizer, stabilizer, carbon black, and stone powder, the manufacturing method comprising the following steps:

adding and mixing raw materials of the bottom material layer to obtain a bottom material layer intermediate, and then internal-mixing and calendering the bottom material layer intermediate to obtain a bottom material layer sheet;

adding and mixing raw materials of the middle material layer to obtain a middle material layer intermediate, and then internal-mixing and calendering the middle material layer intermediate to obtain a middle material layer sheet;

mixing, internal-mixing, and calendering raw materials of the stone-plastic substrate layer to obtain a stone-plastic substrate layer sheet;

sequentially arranging a first wear-resistant layer film, a color film, the middle material layer sheet, the stone-plastic substrate layer sheet, the bottom material layer sheet, and a second wear-resistant layer film, and then carrying out a hot pressing process to obtain a finished product; and a cold pressing process, wherein the cold pressing process is carried out after the hot pressing process and comprises a first cold pressing process and a second cold pressing process.

2. The manufacturing method of the stone-plastic hot pressing flooring according to claim 1, wherein in the hot pressing process, a pressure is controlled in a range of 3-6 MPa, a temperature is controlled in a range of 125-145° C., and hot pressing time is controlled in a range of 1500-2100 s.

3. The manufacturing method of the stone-plastic hot pressing flooring according to claim 1, wherein in the first cold pressing process, a pressure is controlled in a range of 5-8 MPa, a temperature is controlled in a range of 80-145° C., and cold pressing time is controlled in a range of 600-800 s.

4. The manufacturing method of the stone-plastic hot pressing flooring according to claim 1, wherein in the second cold pressing process, a pressure is controlled in a range of 8-15 MPa, a temperature is controlled in a range of 23-80° C., and cold pressing time is controlled in a range of 800-1000 s.

5. The manufacturing method of the stone-plastic hot pressing flooring according to claim 1, wherein after calendering the bottom material layer intermediate or the middle material layer intermediate or the stone-plastic substrate layer, further comprising a slicing operation.

* * * * *